(12) United States Patent
Shalon et al.

(10) Patent No.: US 11,579,467 B2
(45) Date of Patent: Feb. 14, 2023

(54) ULTRA THIN FOLDING GLASSES AND STORAGE DEVICE

(71) Applicant: THINOPTICS, INC., Palo Alto, CA (US)

(72) Inventors: Tadmor Shalon, Palo Alto, CA (US); Gad Ponte, Palo Alto, CA (US)

(73) Assignee: Thinoptics, Inc., Palo Alto, CA (US)

( * ) Notice: Subject to any disclaimer, the term of this patent is extended or adjusted under 35 U.S.C. 154(b) by 0 days.

(21) Appl. No.: 16/646,867

(22) PCT Filed: Sep. 14, 2018

(86) PCT No.: PCT/US2018/051169
§ 371 (c)(1),
(2) Date: Mar. 12, 2020

(87) PCT Pub. No.: WO2019/055844
PCT Pub. Date: Mar. 21, 2019

(65) Prior Publication Data
US 2020/0278563 A1    Sep. 3, 2020

Related U.S. Application Data

(60) Provisional application No. 62/559,419, filed on Sep. 15, 2017.

(51) Int. Cl.
*G02C 5/00*    (2006.01)
*A45C 11/04*   (2006.01)
(Continued)

(52) U.S. Cl.
CPC .............. *G02C 5/006* (2013.01); *A45C 11/04* (2013.01); *G02C 5/06* (2013.01); *G02C 5/08* (2013.01);
(Continued)

(58) Field of Classification Search
CPC . G02C 5/006; G02C 5/20; G02C 5/08; G02C 5/06; G02C 5/16
See application file for complete search history.

(56) References Cited

U.S. PATENT DOCUMENTS 261,799 A    7/1882   Woodward
272,450 A    2/1883   Manning
(Continued)

FOREIGN PATENT DOCUMENTS

CN    101711374 A    5/2010
CN    201597163 U    10/2010
(Continued)

OTHER PUBLICATIONS

Machine translation of DE4312225 C1 retrieved electronically from Espacenet Sep. 16, 2021 (Year: 2021).*
(Continued)

*Primary Examiner* — Cara E Rakowski
(74) *Attorney, Agent, or Firm* — Shay Glenn LLP

(57) ABSTRACT

Embodiments of thin eyeglasses are provided. The eyeglasses comprise first and second lens connected by a resilient bridge. The eyeglasses comprise a first and second ear piece connected to the first and second lens by a first and second hinge. One lens can be rotated about the hinge and over the other lens to place the eyeglasses in a compact configuration.

27 Claims, 19 Drawing Sheets

(51) Int. Cl.
   *G02C 5/06* (2006.01)
   *G02C 5/16* (2006.01)
   *G02C 5/08* (2006.01)
   *G02C 5/20* (2006.01)
   *G02C 5/22* (2006.01)

(52) U.S. Cl.
   CPC ............... *G02C 5/16* (2013.01); *G02C 5/20* (2013.01); *G02C 5/22* (2013.01)

(56) References Cited

U.S. PATENT DOCUMENTS

| | | |
|---|---|---|
| 353,203 A | 11/1886 | Chase |
| 380,491 A | 4/1888 | Kahn |
| 470,029 A | 3/1892 | Wood |
| 529,988 A | 11/1894 | Wood |
| 585,619 A | 6/1897 | Cottet, Jr. |
| 677,996 A | 7/1901 | Kleinert |
| 1,017,579 A | 2/1912 | Nicol |
| 1,919,938 A | 7/1933 | Fielding |
| 1,931,634 A | 10/1933 | Tanasso et al. |
| 1,970,044 A | 8/1934 | Klein |
| 2,004,445 A | 6/1935 | Meyer |
| 2,023,469 A | 12/1935 | Grier |
| 2,036,591 A | 4/1936 | Marciano |
| 2,047,646 A | 7/1936 | Nerney |
| 2,061,411 A | 11/1936 | Tanasso et al. |
| 2,234,729 A | 3/1941 | Montalvo-Guenard |
| 2,478,921 A | 8/1949 | Hansen |
| 2,537,248 A | 1/1951 | Vigano |
| 2,811,897 A | 11/1957 | Belgard |
| 2,975,426 A | 3/1961 | Rabb |
| 3,085,584 A | 4/1963 | Hollinger |
| D209,016 S | 10/1967 | Weissman |
| 3,395,964 A | 8/1968 | Nieder |
| D220,597 S | 4/1971 | Dawson et al. |
| D247,111 S | 1/1978 | Olivan |
| 4,255,024 A | 3/1981 | De Monts et al. |
| 4,577,942 A | 3/1986 | Frieder et al. |
| 4,600,279 A | 7/1986 | Tabacchi |
| D289,122 S | 4/1987 | Meyer et al. |
| 4,772,112 A | 9/1988 | Zider et al. |
| 4,840,476 A | 6/1989 | Rooney |
| D305,478 S | 1/1990 | Lahm et al. |
| 4,896,955 A | 1/1990 | Zider et al. |
| 4,924,245 A | 5/1990 | Dianitsch |
| 5,015,087 A | 5/1991 | Baratelli |
| D318,949 S | 8/1991 | Mawhinney et al. |
| D322,262 S | 12/1991 | Manus |
| D330,456 S | 10/1992 | Lehman |
| D343,402 S | 1/1994 | Scoppettone |
| 5,335,028 A | 8/1994 | Kato et al. |
| 5,369,451 A | 11/1994 | Tamagawa |
| 5,431,506 A | 7/1995 | Masunaga |
| 5,448,317 A | 9/1995 | Huang |
| 5,452,028 A | 9/1995 | Iijima |
| D363,603 S | 10/1995 | Leveen et al. |
| D371,679 S | 7/1996 | Nejman |
| D379,558 S | 6/1997 | Mischenko et al. |
| 5,646,707 A | 7/1997 | Arnette |
| 5,654,785 A | 8/1997 | Shih et al. |
| 5,748,280 A | 5/1998 | Herman |
| D407,591 S | 4/1999 | Bolognia et al. |
| 5,929,966 A * | 7/1999 | Conner .............. G02C 5/20 351/118 |
| 5,949,515 A | 9/1999 | Hoshino |
| D418,857 S | 1/2000 | Paulsen et al. |
| 6,017,119 A | 1/2000 | Huang |
| D421,526 S | 3/2000 | Isaacson |
| 6,077,368 A | 6/2000 | Nakamura et al. |
| D428,253 S | 7/2000 | Huang |
| D435,340 S | 12/2000 | Kojoori |
| 6,158,860 A | 12/2000 | Huang |
| D436,613 S | 1/2001 | Chao |
| D438,904 S | 3/2001 | Reynolds |
| 6,210,004 B1 | 4/2001 | Horikawa et al. |
| 6,264,326 B1 | 7/2001 | Hyoi |
| D446,237 S | 8/2001 | Koevari |
| D451,119 S | 11/2001 | Koevari |
| 6,357,873 B1 | 3/2002 | Spindelbalker |
| 6,371,614 B1 | 4/2002 | Herman |
| 6,641,260 B1 | 11/2003 | Avital |
| 6,773,106 B2 | 8/2004 | Herman |
| 6,814,226 B2 | 11/2004 | Chao |
| D503,087 S | 3/2005 | Dzwill et al. |
| D507,871 S | 8/2005 | DiMarchi et al. |
| D515,805 S | 2/2006 | Jones |
| D518,636 S | 4/2006 | Sievers |
| D527,891 S | 9/2006 | Hoeksema |
| 7,117,990 B2 | 10/2006 | Sharif |
| D555,900 S | 11/2007 | Pippin |
| 7,452,070 B2 | 11/2008 | Oskarsson |
| D585,471 S | 1/2009 | Thompson |
| 7,484,843 B1 | 2/2009 | Lin |
| 7,637,610 B2 | 12/2009 | Graffia |
| 7,748,843 B2 | 7/2010 | Stewart |
| D631,246 S | 1/2011 | Boettner |
| 7,905,591 B2 | 3/2011 | Strobel |
| D651,799 S | 1/2012 | Dial |
| D653,656 S | 2/2012 | Charnas et al. |
| D669,082 S | 10/2012 | Sato |
| D684,367 S | 6/2013 | Phillips et al. |
| D687,376 S | 8/2013 | Farris-Gilbert et al. |
| D692,236 S | 10/2013 | Ashkenazy |
| D703,198 S | 4/2014 | Simmer |
| D703,722 S | 4/2014 | Kim et al. |
| D713,145 S | 9/2014 | Fathollahi |
| D714,058 S | 9/2014 | Owen |
| D714,550 S | 10/2014 | Yoo |
| D715,052 S | 10/2014 | Fair |
| D716,045 S | 10/2014 | Requa |
| D716,049 S | 10/2014 | Fair |
| D719,950 S | 12/2014 | Smith et al. |
| D721,493 S | 1/2015 | Godshaw et al. |
| D724,833 S | 3/2015 | Schneider et al. |
| D724,834 S | 3/2015 | Schneider et al. |
| D726,246 S | 4/2015 | Shalon |
| D726,413 S | 4/2015 | Shalon |
| 9,069,189 B2 | 6/2015 | Shalon |
| 9,081,209 B2 | 7/2015 | Shalon |
| 9,158,125 B2 | 10/2015 | Shalon |
| 9,408,446 B2 | 8/2016 | Liebers et al. |
| D765,975 S | 9/2016 | Hoofnagle et al. |
| 9,581,830 B2 | 2/2017 | Porter |
| 9,845,410 B2 | 5/2017 | Barnett et al. |
| 9,696,756 B1 | 7/2017 | Olsson et al. |
| 9,726,902 B2 | 8/2017 | Shalon |
| D805,298 S | 12/2017 | Shalon |
| 11,042,043 B1 | 6/2021 | Ginoachio |
| 2001/0028431 A1 | 10/2001 | Rossin |
| 2001/0055093 A1 | 12/2001 | Saitoh et al. |
| 2003/0025871 A1 | 2/2003 | Masunaga |
| 2005/0078274 A1 | 4/2005 | Howell et al. |
| 2008/0055539 A1* | 3/2008 | Graffia .................. G02C 5/006 351/63 |
| 2008/0218683 A1 | 9/2008 | Lam et al. |
| 2008/0231800 A1 | 9/2008 | Esser et al. |
| 2009/0033862 A1 | 2/2009 | Margolis |
| 2009/0051868 A1 | 2/2009 | Kwan |
| 2009/0310080 A1 | 12/2009 | Dellapina |
| 2010/0073625 A1 | 3/2010 | Engstrom |
| 2010/0073626 A1 | 3/2010 | Engstrom |
| 2011/0205483 A1 | 8/2011 | Margolis |
| 2011/0210018 A1* | 9/2011 | Friedman ............... A45C 11/04 206/5 |
| 2011/0228210 A1 | 9/2011 | Willett |
| 2012/0140163 A1 | 6/2012 | Hogan |
| 2012/0218506 A1 | 8/2012 | Perez |
| 2012/0293766 A1 | 11/2012 | Pitcairn |
| 2012/0327360 A1 | 12/2012 | Lin |
| 2014/0268005 A1 | 9/2014 | Pluta |
| 2014/0317886 A1 | 10/2014 | Shwartz |
| 2014/0360898 A1 | 12/2014 | Kantor et al. |

(56) References Cited

U.S. PATENT DOCUMENTS

| | | | |
|---|---|---|---|
| 2015/0042947 A1* | 2/2015 | Barnett | G02C 5/20 351/63 |
| 2015/0061166 A1 | 3/2015 | Van De Vrie et al. | |
| 2016/0016370 A1 | 1/2016 | Sheldon et al. | |
| 2016/0018670 A1 | 1/2016 | Lando et al. | |
| 2016/0062139 A1* | 3/2016 | Shalon | A45C 11/04 351/64 |
| 2016/0077356 A1 | 3/2016 | Allen | |
| 2016/0077358 A1 | 3/2016 | Bischoff | |
| 2016/0116761 A1 | 4/2016 | Sbardella | |
| 2016/0320632 A1 | 11/2016 | Paulet Vazquez | |
| 2017/0146815 A1* | 5/2017 | Porter | G02C 5/006 |
| 2017/0255229 A1 | 9/2017 | Buckley | |
| 2017/0299885 A1 | 10/2017 | Shalon | |
| 2017/0322428 A1 | 11/2017 | Da Col | |
| 2020/0012122 A1 | 1/2020 | Johnson et al. | |
| 2021/0080748 A1 | 3/2021 | Ponte et al. | |

FOREIGN PATENT DOCUMENTS

| | | | |
|---|---|---|---|
| CN | 201600509 U | 10/2010 | |
| CN | 202815334 U | 3/2013 | |
| CN | 203365820 U | 12/2013 | |
| CN | 107290866 A | 10/2017 | |
| DE | 4312225 C1 * | 12/1993 | G02C 1/02 |
| DE | 4407313 A1 | 9/1995 | |
| DE | 102013007173 A1 | 10/2014 | |
| EP | 1876488 A1 | 1/2008 | |
| EP | 2016457 B1 | 6/2011 | |
| GB | 328584 A | 4/1930 | |
| IT | PD20110202 A1 | 12/2012 | |
| IT | UD20110080 A1 | 12/2012 | |
| JP | S51-16057 U | 2/1976 | |
| JP | H01-64616 U | 4/1989 | |
| JP | H04-26755 A | 1/1992 | |
| JP | H08-146357 A | 6/1996 | |
| JP | 2014213120 A | 11/2014 | |
| KR | 2020130002469 U | 4/2013 | |
| KR | 1020160046503 A | 4/2016 | |
| WO | WO2006/114837 A1 | 11/2005 | |
| WO | WO2010/086650 A1 | 8/2010 | |
| WO | WO2011/068051 A1 | 4/2013 | |
| WO | WO2014/133352 A1 | 9/2014 | |
| WO | WO2019/065844 A1 | 3/2019 | |
| WO | WO2019/210222 A1 | 10/2019 | |

OTHER PUBLICATIONS

Ponte et al.; U.S. Appl. No. 29/743,439 entitled "Eyeglasses case," filed Jul. 21, 2020.

Google: Parasite eyewear; 3 pages; retrieved from the internet (https://www.google.com/search?q=parasite+eyewear&client=safari v ed=0ahUKEwiipJC_4JPWAhXoyFQKHZ3HD-wQ_AUICygC &btw=1416&bih=789) on Sep. 7, 2017.

Kickstarter; Roav—World's thinnest folding sunglasses; 14 pages; retrieved from the internet (https://www.kickstarter.com/projects/653457680/roav-anywhere-eyewear) on Jan. 8, 2019.

Pince-nez; www.en.wikipedia.org/wiki/Pince-nez; pp. 1-4; printed Sep. 20, 2013.

Thinoptics; Glasses and Keychain case; 4 pages; retrieved from the internet (https:/www.thinoptics.com/keychain-case-glasses) on Jan. 8, 2019.

Vimeo; FlashCard-Video; (Screenshot); 2 pages; retrieved from the internet (https://vimeo.com/266171301); on Apr. 23, 2018.

Wikipedia; Circular segment; 3 pages; retrieved from the internet (https://en.wikipedia.org/wiki/Circular_segment) on Jan. 8, 2019.

Ponte et al.; U.S. Appl. No. 16/487,859 entitled "Ultrathin Eyeglasses," filed Aug. 22, 2019.

* cited by examiner

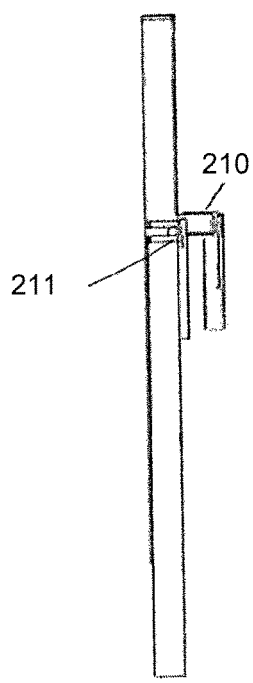
FIG. 2D  FIG. 2E
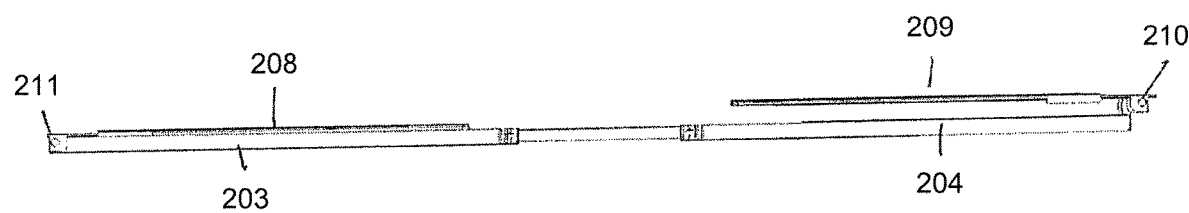
FIG. 2F
bottom view
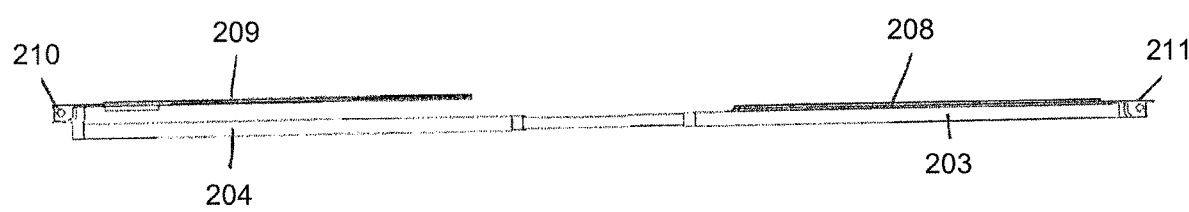
top view
FIG. 2G

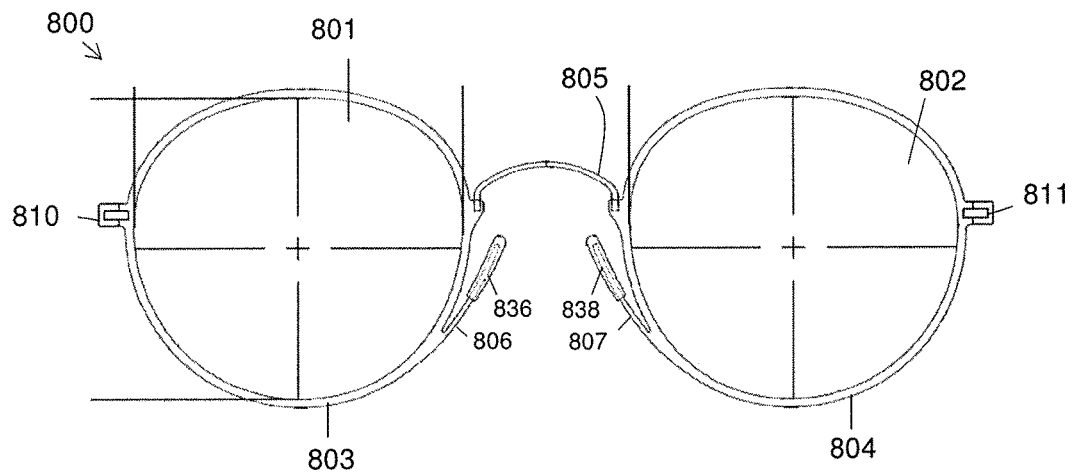
FIG. 8A
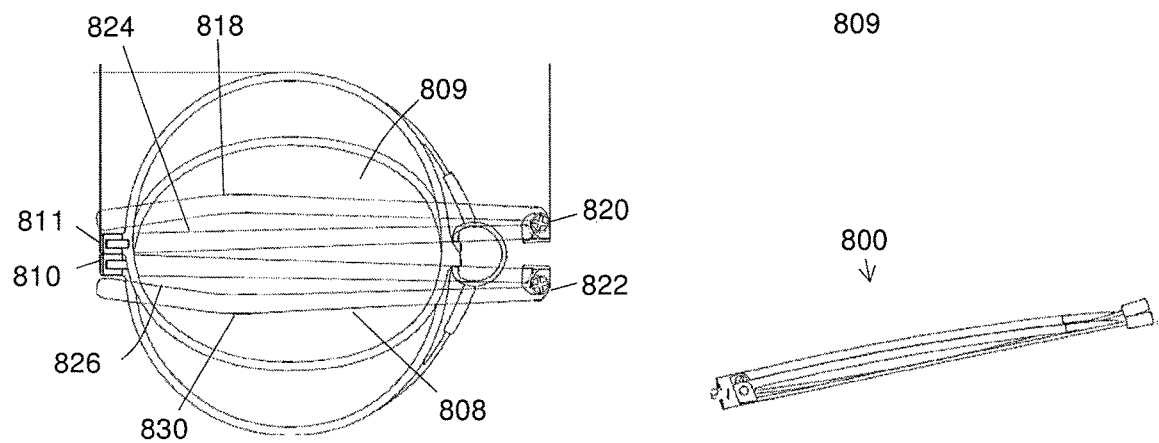
FIG. 8B
FIG. 8C
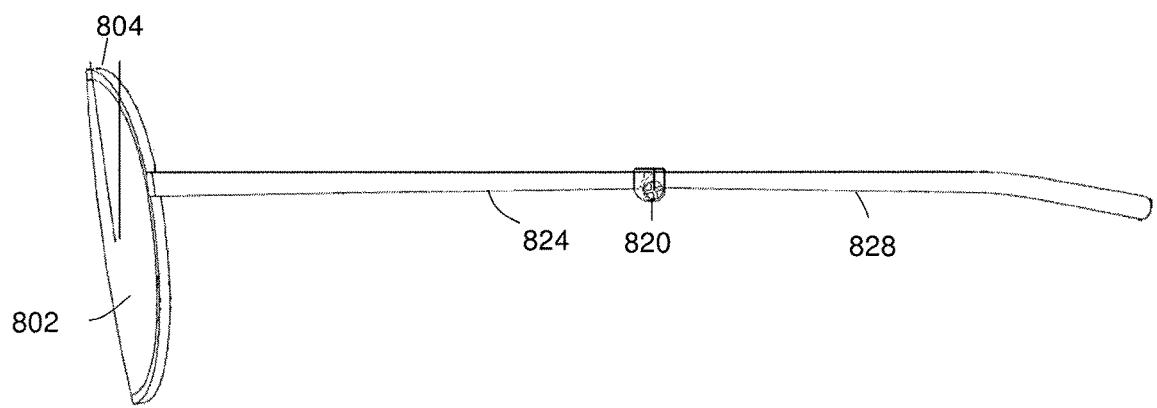
FIG. 8D

ULTRA THIN FOLDING GLASSES AND STORAGE DEVICE

CROSS-REFERENCE TO OTHER APPLICATIONS

This application claims the benefit of U.S. Provisional Patent Application No. 62/559,419, filed on Sep. 15, 2017, the entire disclosure of which is hereby incorporated by reference.

INCORPORATION BY REFERENCE

All publications and patent applications mentioned in this specification are herein incorporated by reference to the same extent as if each individual publication or patent application was specifically and individually indicated to be incorporated by reference.

SUMMARY OF THE DISCLOSURE

Eyewear and in particular sun glasses, reading glasses and safety glasses that are used episodically benefit from a compact, convenient carrying case that attaches to key chains, smart phones, clothing or placed in pockets or purses. The present invention provides a convenient way to create ultrathin glasses that can be inserted folded into a carrying case not much bigger than the area of one lens, or the thickness of the two thin folded lenses.

In some embodiments, an eyewear system is provided. The eyewear system comprises a first lens; a second lens; a resilient bridge connecting the lenses; a first ear piece extending from a side of the first lens, the first flexible ear piece configured to fold flat against the first lens; and a second ear piece extending from a side of the second lens, the second flexible ear piece configured to fold flat against the second lens; wherein a thickness of the eyewear system when the first and second flexible ear pieces are folded is equal to a thickness of one of the first and second lens plus the thickness of one of the first and second ear pieces plus any base curve thickness.

In some embodiments, the eyewear system comprises a first hinge configured to connect the first lens and the first flexible ear piece, wherein the first hinge is positioned within a thickness of the first lens; and a second hinge configured to connect the second lens and the second flexible ear piece, wherein the second hinge is positioned within a thickness of the second lens. The first and second hinges can protrude from a side of the first and second lenses. In some embodiments, the thickness of the eyewear system, when the ear pieces are folded, is about 2-10 mm. The thickness of the eyewear system, when the ear pieces are folded can be less than about 2.3 mm.

In some embodiments, an eyewear system is provided. The system comprises a first lens; a second lens; a resilient bridge connecting the lenses; a first hinge connecting a first flexible ear piece extending from a side of the first lens to the first lens, the first flexible ear piece configured to fold flat against the first lens; a second hinge connecting a second flexible ear piece extending from a side of the second lens, the second flexible ear piece offset from the second lens by a thickness of the first lens, wherein at least a portion of the first lens is configured to be moved over the second lens to form a compact configuration, and a thickness of the eyewear system in the compact configuration is equal to a thickness of the first lens, the thickness of the second lens, the thickness of one of the first and second ear pieces plus any base curve thickness.

In some embodiments, the thickness of the compact configuration is about 4-10 mm. The eyewear system can be configured to withstand a force of up to about 100 kg when in the compact configuration. In some embodiments, a weight of the system is less than about 12 g. The ear pieces can be configured to exert a force <5 g-force, thereby keeping the system stable on the user's face. In some embodiments, the eyewear system comprises a catch configured to secure the ear pieces in a folded position. The system can be configured to be free of any moments caused by applying a force to a front or back side of the system. In some embodiments, the second hinge is configured to catch onto the first hinge to keep the eyewear system in a compact configuration. The first and second ear piece can each comprise a first and second segment connected by a hinge. In some embodiments, the first lens is configured to be rotated over the second lens. The first and second ear pieces can be configured to be contained within the lens against which they fold.

In some embodiments a carrying case is provided. The case is configured to conform to a folded configuration of the eyewear systems disclosed herein. In some embodiments, the case is configured to be positioned on a wrist, a phone, a watch, a wallet and a temple pad. The case can comprise a top and bottom portion hinged together.

The case can be configured to conform to a compact configuration of the eyewear systems disclosed herein. The case can comprise a projection configured to interact with a portion of the glasses to stabilize the eyewear system within the case. In some embodiments, the hinge of the eyewear system is configured to be hooked around the projection.

In some embodiments, a method of manufacturing a pair of thin eyeglasses is provided. The method comprises providing a first lens; providing a second lens; connecting the lenses with a resilient bridge; connecting a first flexible ear piece to a side of the first lens to the first lens using a first hinge, the first flexible ear piece configured to fold flat against the first lens; connecting a second flexible ear piece to a side of the second lens using a second hinge, the second flexible ear piece offset from the second lens by a thickness of the first lens, wherein at least a portion of the first lens is configured to be moved over the second lens to form a compact configuration, and a thickness of the eyewear system in the compact configuration is equal to a thickness of the first lens, the thickness of the second lens, the thickness of one of the first and second ear pieces plus any base curve thickness.

In some embodiments, a method of folding a pair of thin eyeglasses comprising a first lens connected to a second lens by a resilient bridge is provided. The method comprises rotating the second lens about the resilient bridge in a clockwise direction until a second hinge connecting a second ear piece to the second lens rotates past a first hinge connecting a first ear piece to the first lens; and catching the second hinge on the first hinge to hold the eyeglasses in a compact configuration.

In some embodiments, the method comprises folding the first ear piece against the first lens. The method can comprise folding the first ear piece against the first lens comprises folding a first segment of the first ear piece against a second segment of the first ear piece. In some embodiments, the method comprises folding the second ear piece against the second lens. The method can comprise folding the second ear piece against the second lens comprises folding a first segment of the second ear piece against a second segment of the second ear piece.

BRIEF DESCRIPTION OF THE DRAWINGS

FIGS. 2A-2G show various views of an embodiment of eyeglasses.

FIGS. 8A-8D show various views of another embodiment of eyeglasses.

DETAILED DESCRIPTION

The present invention describes ultrathin glasses having ear pieces and nose pieces, whose lenses can be folded over each other, folded toward each other, or otherwise moved with respect to each other so that they can be stored with one lens over the other in overlapping positions in an ultra thin configuration. Currently available foldable glasses do not store with their lenses moved into overlapping positions in an ultra thin configuration. The components of existing glasses do not conform to or sit against one another in the folded configuration, creating space between two or more of the folded components. This spacing increases the form factor of the glasses. Even a small amount of space between multiple components can add a significant volume to the overall form factor, causing the folded glasses' form factor to be similar to that of a folded pair of regular glasses (e.g., with just the ear pieces folded), thereby reducing any advantage provided by the folding ability of the glasses. The spacing also allows moments to develop between components of the glasses when a force is applied to them, such as when placed into a pants' pocket, making them more susceptible to breaking than the glasses of the current application.

Typical optical or sunglass lenses can be thought of as having been cut from a surface of a sphere whose radius of curvature is defined as a base curve. Base curve is defined in diopters, D, 1/radius of curvature of the sphere in meters. For example, a base curve of 2D, means a curvature of ½ meter. A base curve of OD, means a radius of curvature of I/O or infinity which means a flat lens that is sometimes used in sunglasses or safety glasses.

The lens height and width shall mean the vertical and horizontal axis of a lens when worn.

A lens with base curve greater than 0 adds to the thickness of glasses because it is higher at the center than at the edges by this formula: base curve thickness equals to $1/D - \sqrt{(1/D)^2 - (\text{lens width}/4))}$.

Thickness shall mean an orthogonal distance to the height and width as measured between the back most surface of the lenses or folded frame to the front most surface of the lens or folded frame when worn or when stored. Thickness can also refer to the minimum internal opening in a storage case used to store the glasses.

This invention describes how to minimize the thickness of the glasses. Because lenses of various base curves could be used, the term 'thickness' shall mean the thickness of all the components in the stored configuration with lenses whose base curve is 0. Any extra thickness due to the base curve is added to the thickness by the formula described above.

In some embodiments, the thickness of the folded glasses is about 4 mm. Other thicknesses are also possible (e.g., 4.1 mm, 4.2 mm, 4.3 mm, 4.4 mm, 4.5 mm, 4-4.5 mm, 4-10 mm, 4-5 mm, 4-6 mm, 5-7 mm, 6-8 mm, 8-10 mm, etc.).

Figure 1:
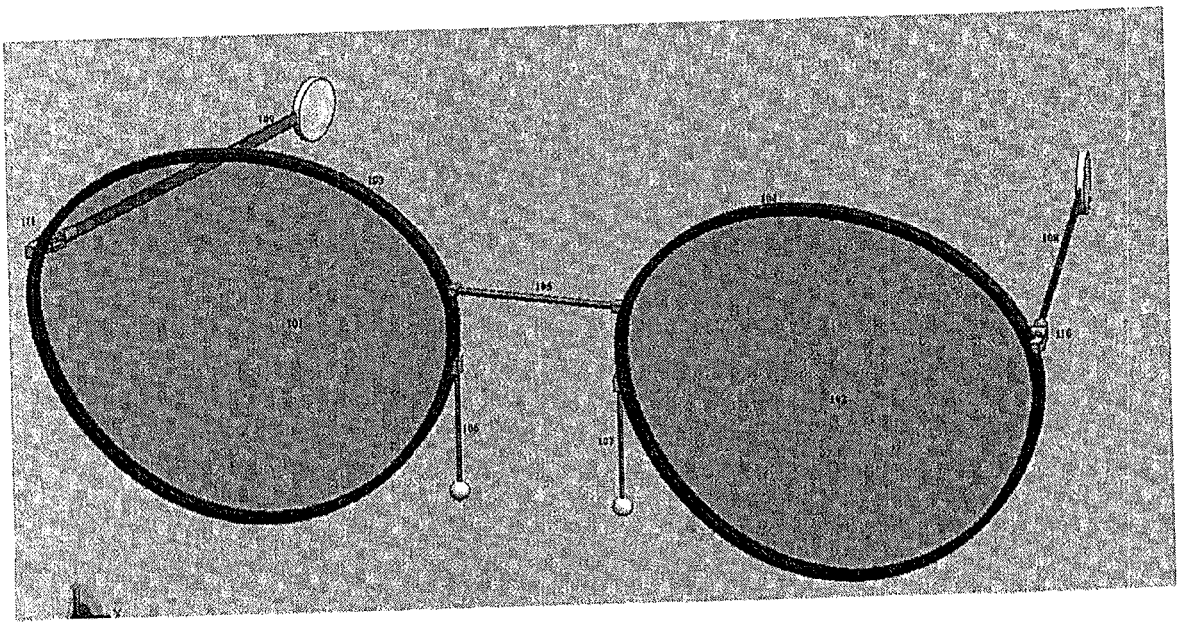
FIG. 1 is a perspective view of eyeglasses having a bendable bridge.

FIG. 1 illustrates an embodiment of glasses 100 with lenses 101, 102 enclosed in lens wire frames 103, 104 respectively. The lenses are connected by a bridge 105. Each lens has a nose piece 106, 107 and folding temple pieces 108, 109 connected to the lenses 101, 102 via hinges 110, 111. As explained in further detail herein, in some embodiments, the glasses comprise folding and retractable ear pieces instead of temple pieces. It will be understood that the term ear pieces can refer to either temple pieces that rest on the user's temples or ear pieces that reach the top of the user's ear.

The lens can be mounted in a lens wire about 2 mm thick. Other thicknesses are also possible (e.g., 1 mm, 3 mm, 1-3 mm, 1.5-2.5 mm, 2-2.5 mm, 1.5-2 mm, etc.) A bridge 105 extends between and connects the two lenses and frames. The bridge comprises suitable flexible torsion resistant material such as wire (e.g., nitinol wire, nitinol flat wire). The wire can have dimensions of about 0.3 mm thick by 1.5 mm wide. Other dimensions are also possible (e.g., about 0.2 mm, 0.4 mm, 0.1-0.5 mm thick and width of about 1-2 mm, 1.25 mm, 1.75 mm, etc.). A flat wire bridge can be arranged such that the thinnest dimension faces the front of the glasses 100. This configuration can help ensure that the glasses do not twist out of plane, but still allow the glasses to be manipulated into a folded configuration for storage. The bridge material can be swedged, glued, or welded into suitable fitments no thicker than about 2 mm or no thicker than the thickness of the lens frames or if attached directly to the lens, no thicker than the lens plus the mounting hardware. The bridge can be configured such that the lenses can be rotated over each other so their base curves' extra thickness, if any, nestle within each other such that the thickness will be 4 mm or the thickness of the frame or lens if no frame is used plus any additional thickness due to the lens' base curve. The bridge provides resistance to torsion between the lenses so they are maintained in the same plane when worn by the user.

In some embodiments, the bridge can be made of multiple flexible elements such as 2 or more wires (e.g., nitinol wires), each about 0.2-0.5 mm in diameter, parallel to each other to provide a bendable bridge resistant to lens torsion.

In some embodiments, the bridge can be made from rigid material with a central hinge. For example, the central hinge can be no thicker than about 2 mm, but in such a case, the thickness of the glasses will be 2 mm plus two times base curve thickness.

The nose pieces 106, 107 are made of suitable flexible material such as nitinol wire, typically about 0.5 mm in diameter. Other diameters are also possible (e.g., about 0.3 mm, 0.4 mm, 0.6, mm, 0.7 mm, 0.3-0.7 mm). The suitable flexible material can also comprise flat nitinol with dimensions of about 0.3 thick by 1.5 mm wide. Other thicknesses are also possible (e.g., 0.1 mm, 0.2 mm, 0.4 mm, 0.5 mm, 0.1-0.5 mm). Other widths are also possible (e.g., about 1 mm, 1.25 mm, 1.75 mm, 2 mm, 1-2 mm). The suitable flexible material can also comprise thin polycarbonate or another polymer. The nose piece can terminate in a nose pad where the total thickness is no greater than 2 mm. Other thicknesses are also possible (e.g., about 1-3 mm). In some embodiments, the nose pads can be mounted such that they do not lay flat in the plane of the lens but are flexible so that they are pushed into the plane of the lenses in the stored configuration. In some embodiments, the nose pads can be made of a rigid material whose thickness does not exceed about 2 mm or the thickness of the frames 103, 104. Other thicknesses are also possible (e.g., the thicknesses described with respect to frames 103, 104). The size of the nose pad can be sufficient to distribute the pressure exerted by the weight of the glasses and deformation of the nitinol to the skin. In some embodiments, the nose pads comprise a disk of about 2 mm (or about 1-3 mm) in diameter or an oval shape whose minor axis is less than the frame's thickness and major axis long enough to contact the user's nose to distribute the pressure described above.

The ear pieces 108, 109 are made from thin rigid or flexible material such as nitinol. The material can, for example, have dimensions of about 0.3 mm×1.5 mm. Other dimensions are also possible (e.g., widths of about 0.1 mm, 0.2 mm, 0.4 mm, 0.5 mm, 0.1-0.5 mm and lengths of about 1 mm, 1.25 mm, 1.75 mm, 2 mm, 1-2 mm, etc.). The ear pieces can terminate in a temple pad. The pad can comprise a circular shape of about 3-20 mm in diameter. Other shapes are also possible. The pad can comprise any other suitable shape such that the spring force exerted by the pieces is distributed to minimize the pressure on the temple or ear.

Figure 2A:
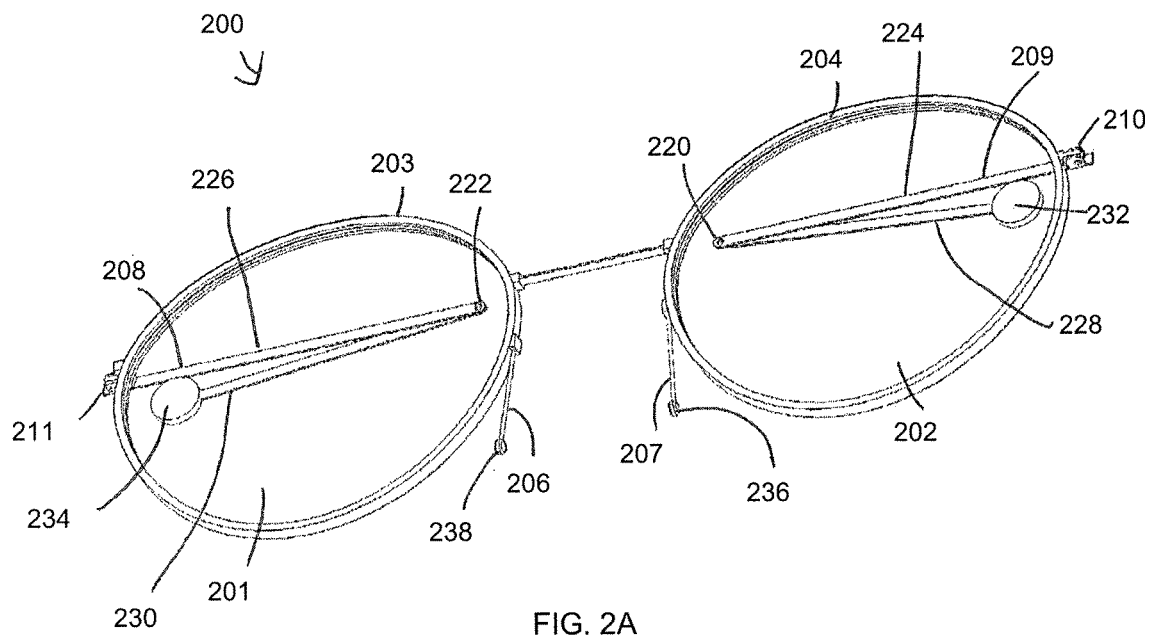

The ear pieces can connect to a hinge whose pivot point is substantially within the plane of the lens such that when the ear piece is folded for storage the thickness will not exceed the thickness of the lens or lens frame and the thickness of one ear piece, (e.g., 2.3 mm), as shown in FIG. 2A. Alternatively, as shown in FIGS. 2E-2H, 3D-3F and 4A-4C, one of the hinges can be offset by the lens thickness, so that when the lenses are rotated over each other for storage, both ear pieces will lay flat on top of the lens. This can result in an ultrathin profile of the glasses, as shown in FIG. 2C-2F. For example, in some embodiments, this can result in a thickness of 4.3 mm.

In some embodiments, the ear pieces can be made from one or more wires (e.g., nitinol wires) with a diameter of about 0.3-1 mm, held in parallel between the hinge and temple or ear piece.

The open angle of the hinge can be limited to less than 90 degrees so that when open, the ear pieces exert slight pressure on the temple via the temple disk. The slight force can be less than 5 g-force by deforming the nitinol ear piece. Because of the light nature of the glasses, it does not take an excessive amount of force to stabilize the glasses on a user's face. In this configuration, the length of each ear piece with its temple disk is configured so that in the folded configuration, they are contained within the area of the folded lenses, as shown in FIGS. 2A-2D and 3A-3C. For example, a length of the temple pieces can be about 40-60 mm in folded position and roughly twice that when extended.

The configuration described above results in very light glasses whose weight is typically less than 12 g plus the weight of the lenses. As noted above, this allows the glasses to securely fit on the user's face with maximum comfort and the minimal force exerted by the temple disks of the ear pieces.

Figure 2B:
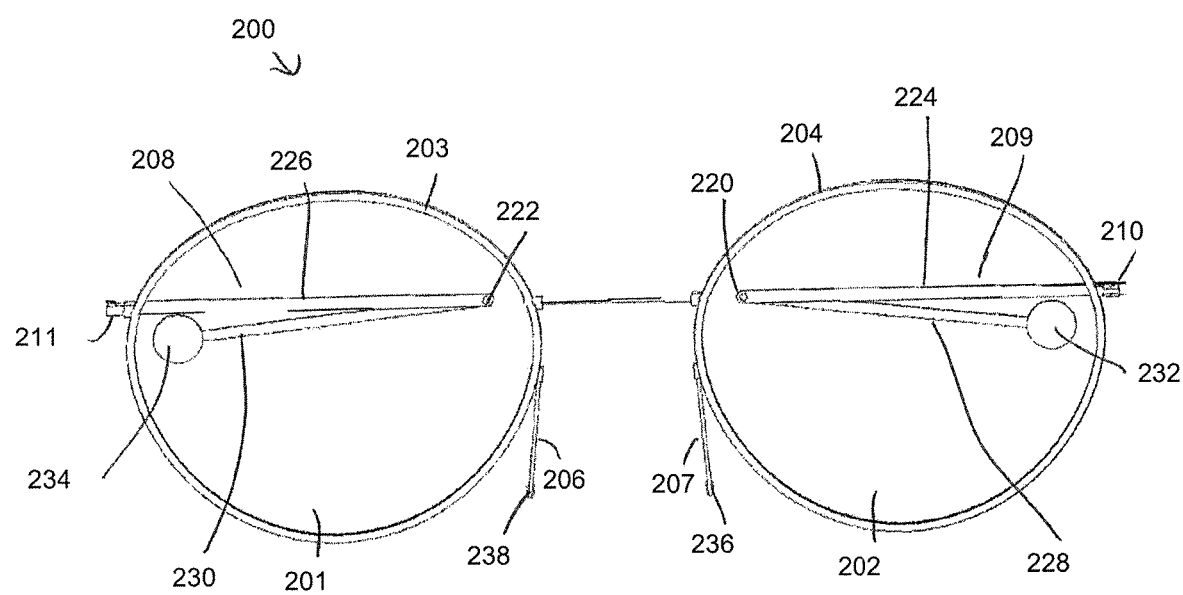
Figure 2C:
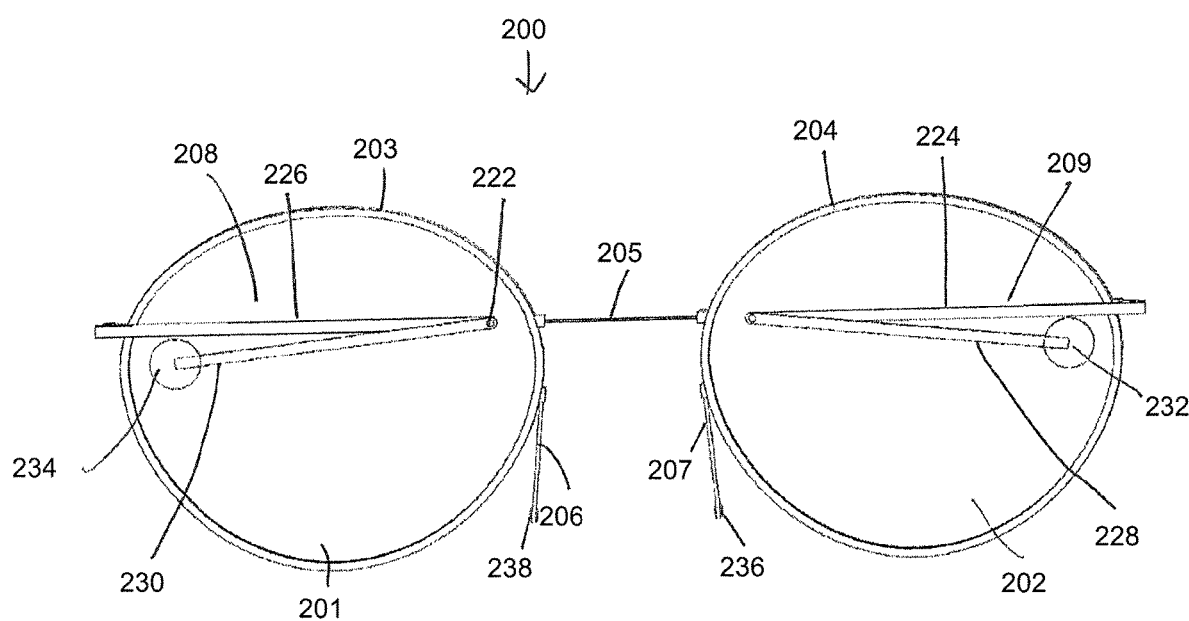

FIGS. 2A-2G show various views of another embodiment of a pair of glasses 200. FIGS. 2A-2C illustrate front perspective, front, and back views, respectively. The glasses 200 are similar to the glasses 100 shown in FIG. 1, but the ear pieces 208, 209 each comprise a hinge 220, 222 (e.g., a pivot hinge), allowing the unfolded ear pieces to extend to a longer length than that of ear pieces 108, 109 and still fit within the lenses 201, 202 when in a folded configuration. Each ear piece comprises two segments, a first segment 224, 226, extending from each hinge 210, 211, and a second segment 228, 230, on an opposite side of the hinge from the first segment, and terminating in a temple or ear pad 232, 234. The first segment can have a length of about 35-60 mm. The second segment can have a length of about 35-60 mm.

Unless otherwise described, glasses 200 comprise comparable or similar features to those of glasses 100. For example, the glasses 200 comprise two lenses 201, 202, each surrounded by a frame 203, 204. Each frame 203, 204 comprises a hinge 210, 211, connecting the ear pieces 208, 209 to the lens frame 203, 204. The glasses 200 comprise nose pieces 206, 207 terminating in nose pads 236, 238. A bridge 205 connects the lenses and frames.

FIGS. 2D and 2E show side views of the glasses 200. The ultrathin profile of the glasses is shown in these figures. The thickness of the glasses primarily comprises the thickness of the lens frames. The flexible ear pieces fold against the lenses and add a minimal thickness (thickness of one of the ear pieces) to the profile of the glasses. Hinge 211 sits against the frame, while the hinge 210 is offset from the frame, described in more detail below.

FIGS. 2F and 2G show bottom and top views of the glasses 200, respectively. As shown in these figures, the hinge 210 is positioned within the plane of the thickness of the lens frame and pivots the ear piece such that it sits flush against the lens. This hinge position protruding from the side of the lens frame is different from traditional glasses, which generally set the hinge back from the frames for aesthetic effect. The more obtrusive position of the hinge 211 allows for a more snug fit of the ear piece 208 when folded than in traditional glasses frames. The hinge 211 is offset from the frame 204 by the thickness of the frame 203. This spacing caused by the offset hinge 211 allows the thickness of the frame 203 to fit between the frame 204 and the ear piece 209 when the lenses are folded to be adjacent and nestle within one another. The offset of the hinge 211 also allows the ear piece 209 to sit flush against the lens frame 203 when the lenses are in the overlapping configuration (e.g., folded over or towards one another, moved relative to one another). The position of both hinges allowing flush positioning of the ear pieces 208, 209 allows the glasses 200 to have a clean and compact form factor when folded, as described in more detail below.

Figure 3A:
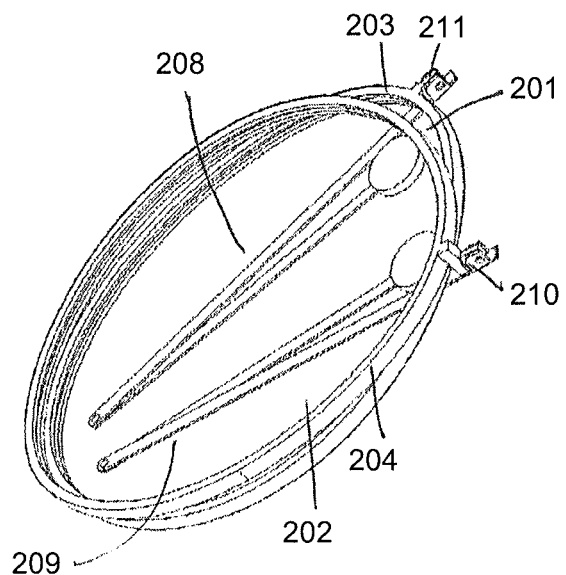
FIGS. 3A-3F illustrate various views of the eyeglasses of FIGS. 2A-2H in a configuration with the lenses folded over one another.
Figure 3B:
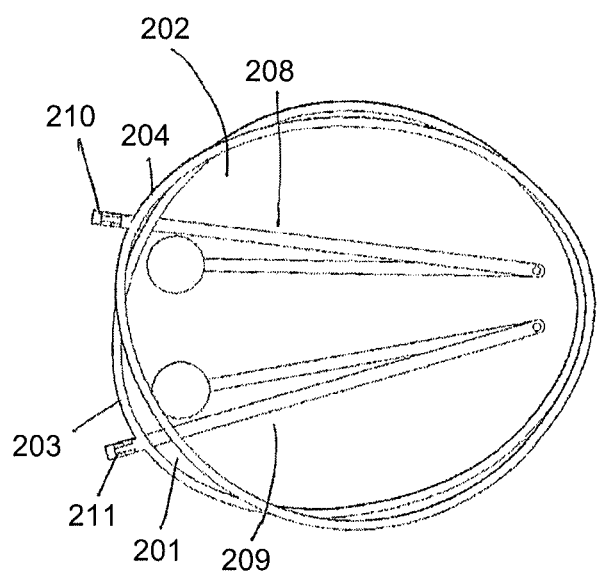

FIGS. 3A-3H illustrate the glasses 200 with the lenses in an overlapping configuration in which the lenses 201, 202 are folded or otherwise moved around the bridge. FIGS. 3A and 3B show a perspective view and front view, respectively, of the glasses 200 in this overlapping configuration. The ear pieces 208, 209 are folded such that they fit within the area of the lens apart from the hinge pieces which protrude from the frame. As such, the total area of the folded glasses is about the area of one lens, for example, 2000 mm². As shown in FIGS. 3A and 3B, the ear pieces are configured to fold such that they do not overlap, thereby minimizing the thickness the ear pieces contribute to the thickness of the folded glasses.

Figure 3C:
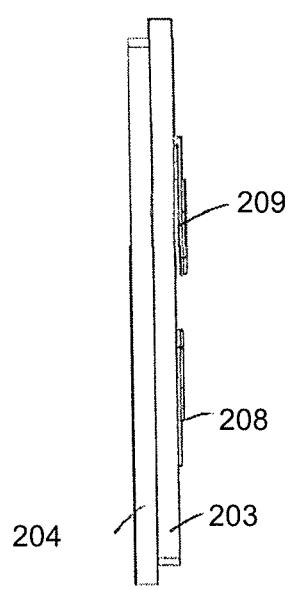
Figure 3D:
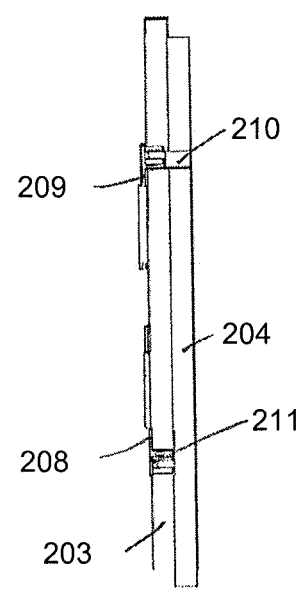
Figure 3E:
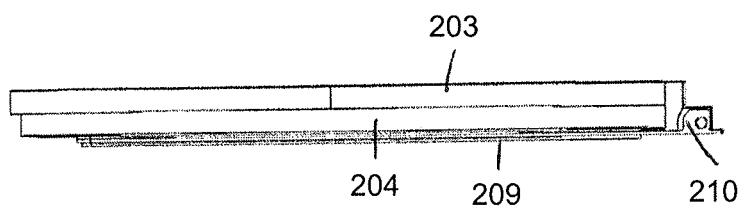
Figure 3F:
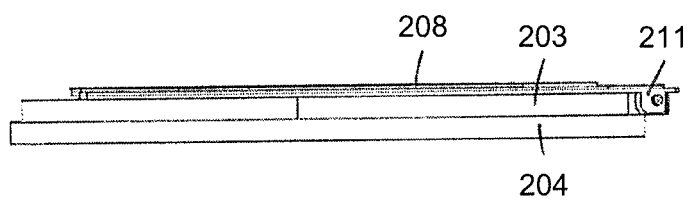

FIGS. 3C and 3D show side views of the glasses 200 in the overlapping configuration. FIGS. 3E and 3F show top and bottom views of the glasses in the overlapping configuration. As shown in these figures, the glasses 200 have a very small footprint. The thickness is made of the thickness of the frames 203, 204, and the small thickness of the ear pieces. The ear pieces do not fold over one another, so the thickness of only one ear piece contributes to the thickness of the overall glasses in this configuration. For example, the thickness can be about 4.3 mm. Other thicknesses are also possible (e.g., about 4-4.5 mm, 4-5 mm, 4-6 mm, 3-6 mm, 3-7 mm, 4-8 mm, 3-10 mm, etc.)

Figure 4A:
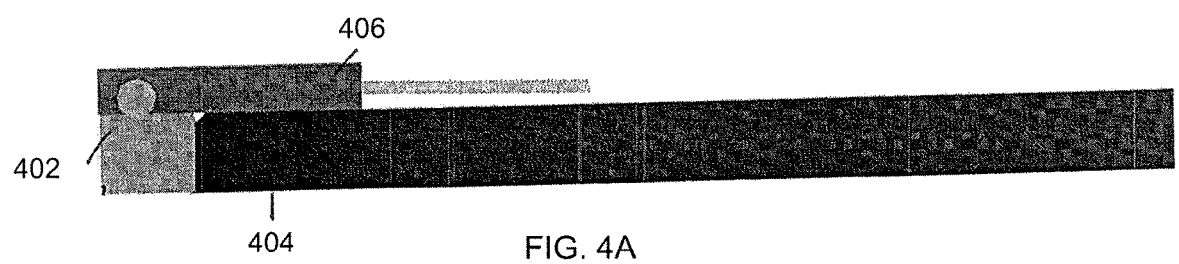
FIG. 4A-4C illustrate detailed views of embodiments of the ear piece hinges of the glasses.
Figure 4B:
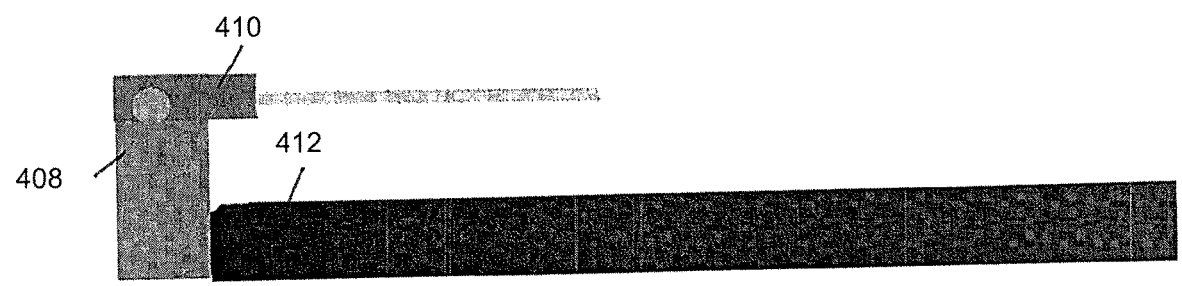
Figure 4C:
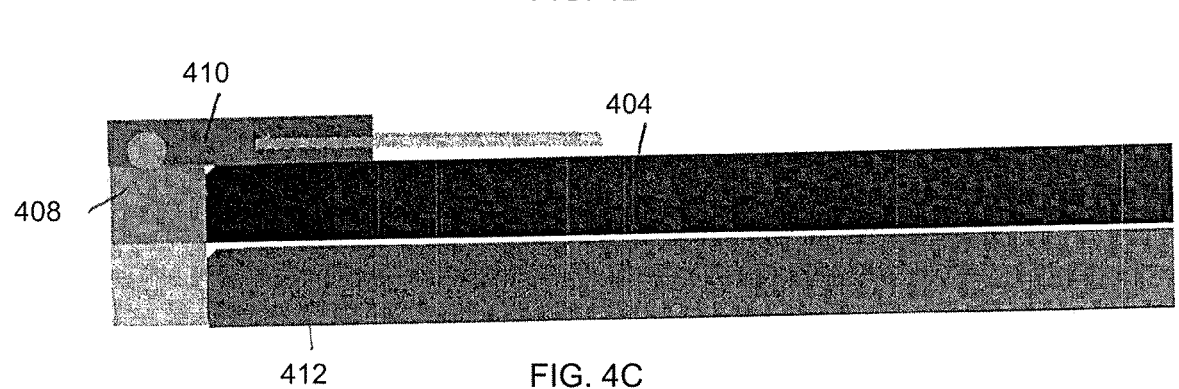

FIGS. 4A-4C show more detailed views of the hinge configuration of the glasses. FIG. 4A shows a hinge 402 positioned within the same plane or thickness of the lens 404. This allows the ear piece 406 to fold flush to the lens. FIG. 4B illustrates hinge 408 attaching ear piece 410 to the other lens 412. The hinge 408 is offset from the lens 412 by a distance equivalent to the thickness of the lens 404. FIG. 4C shows the lenses 404, 412 folded over one another. The lens 404 fits between the ear piece 410 and the lens 412. The offset of the hinge 408 allows the lenses to stack together and allows the ear piece 410 to fold flush to the lens 404, streamlining the thickness of the glasses in this folded configuration.

The glasses 200 can be stored in a configuration with just the ear pieces folded against the frames, as shown in FIGS. 2A-2G. As described above, the thickness of such a pair of glasses with the ear pieces folded is the thickness of the lens or lens frame, the thickness of an ear piece, and any base curve. In some embodiments, the glasses 200 can be stored in an overlapping configuration, as shown in FIGS. 3A-4C. As described above, the thickness of such a pair of glasses is the thickness of both lenses or lens frames, the thickness of an ear piece, and any base curve.

Figure 5A:
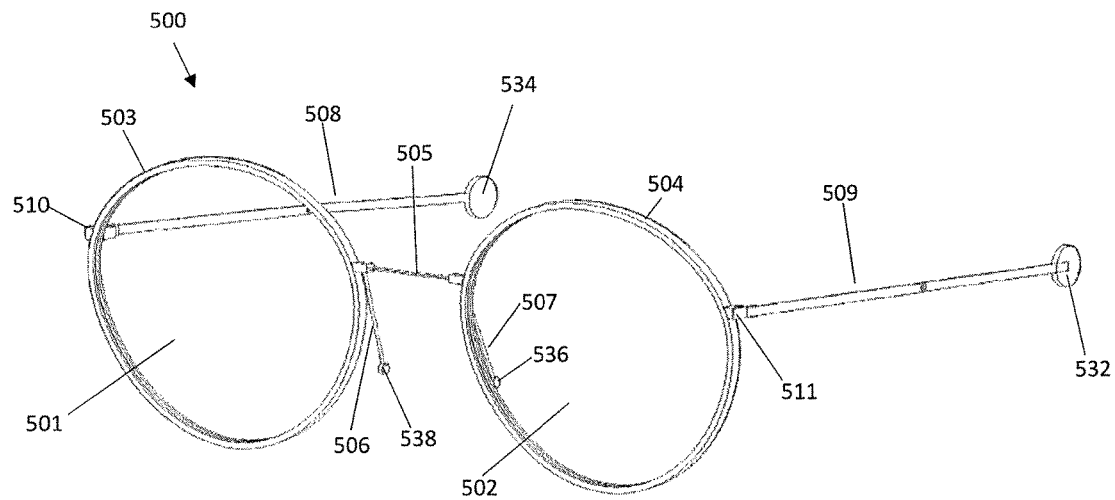
FIG. 5A-5H illustrate another embodiment of eyeglasses.
Figure 5B:
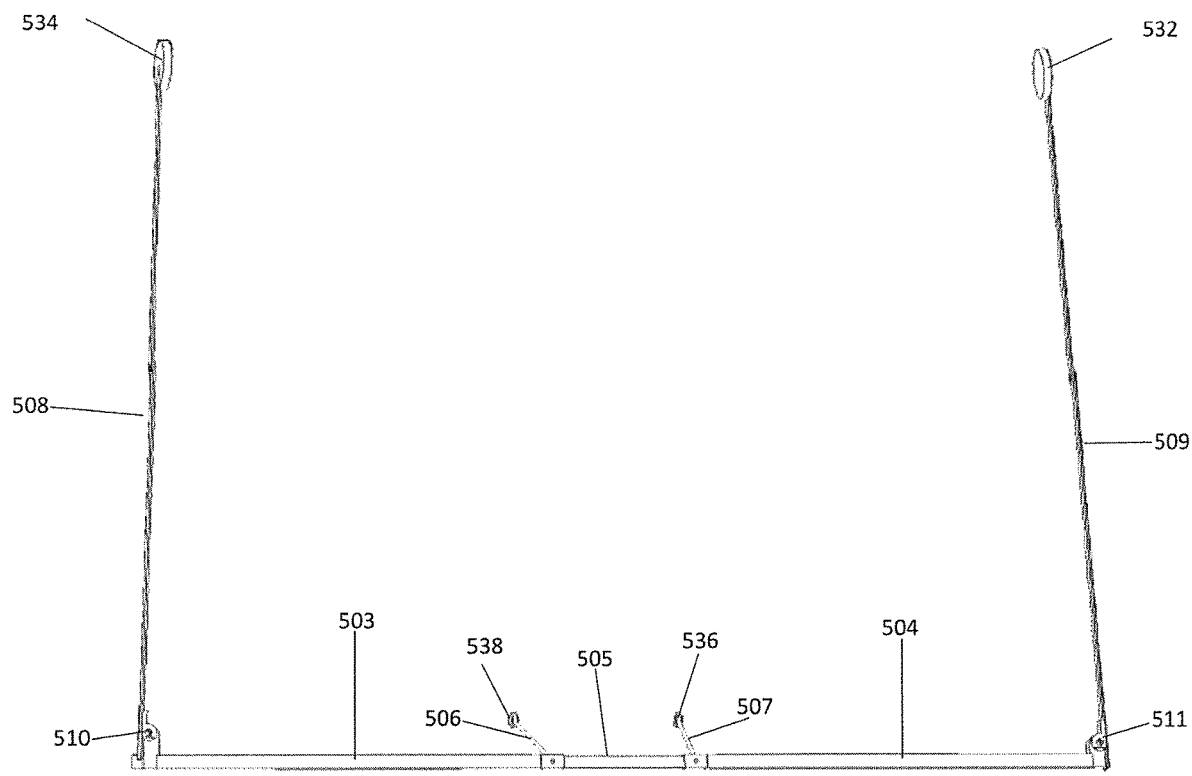

FIGS. 5A-5H show various views of another embodiment of eyeglasses 500. Unless otherwise described, the glasses 500 comprise components similar to those shown in FIGS. 1, 2A-2G, and 3A-3F. FIGS. 5A and 5B show front perspective and top views of the glasses 500 with the ear pieces in an open configuration. The glasses comprise lenses 501, 502 positioned within lens frames 503, 504, respectively. A bridge 505 connects the lens frames 503, 504. Nose pieces 506, 507 extend from a point near the junction of the bridge 505 and a side of each lens frame. The nose pieces terminate in nose pads 536, 538. Hinges 510, 511 connect ear pieces 508, 509 to a side of each lens frame 503, 504. The ear pieces 508, 509, terminate in temple pads 534, 532.

Figure 5C:
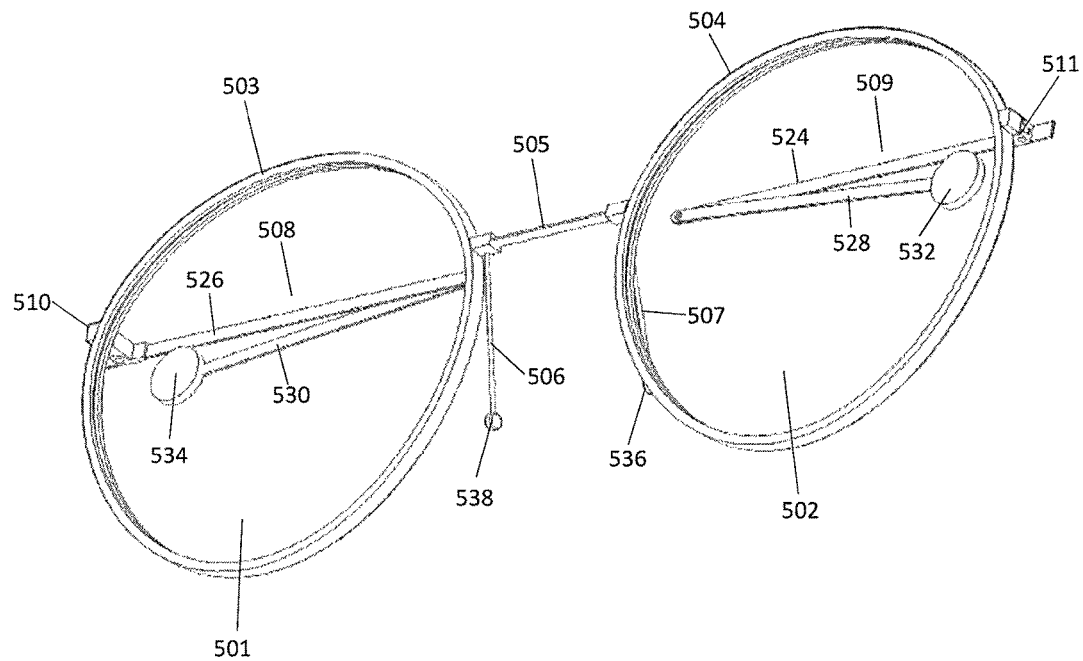
Figure 5D:
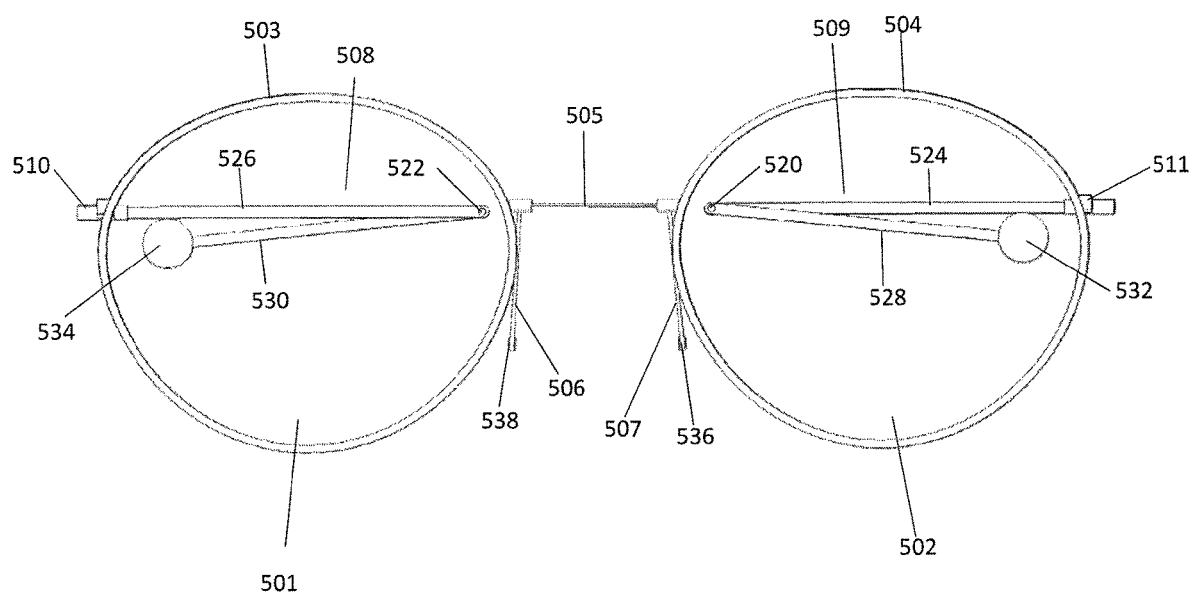
Figure 5E:
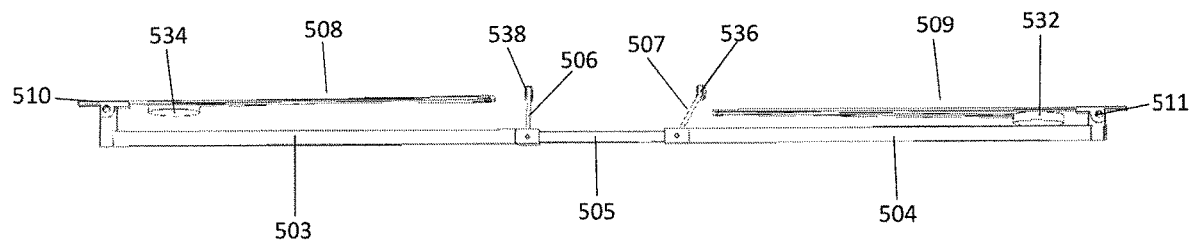

FIGS. 5C-5E show front perspective, front, and top views of the glasses 500 with the ear pieces in a folded configuration. Ear piece 509 is folded towards lens frame 504. Ear piece 509 comprises a first segment 524 and a second segment 528 connected by hinge (e.g., pivot hinge) 520. Ear piece 508 is folded towards lens frame 503. Ear piece 508 comprises a first segment 526 and a second segment 530 connected by hinge (e.g., pivot hinge) 522. As described above with respect to other embodiments, each ear piece folds to fit within the area of the lens. FIG. 5H shows that hinge 511 is offset from lens frame 504 by a distance equal to the thickness of temple pad 532 to allow the ear piece (e.g., first segment 524) to fold over the temple pad 532, parallel to lens frame 504. The hinge 510 is offset from the lens frame 503 by a distance equal to the thickness of the lens frame 504 and the offset distance of the hinge 511 (e.g., thickness of the temple pad). This allows lens frame 504 to be folded, rotated, or otherwise moved over lens frame 503, and allows ear piece 508 to be folded flat over lens frame 504.

Figure 5F:
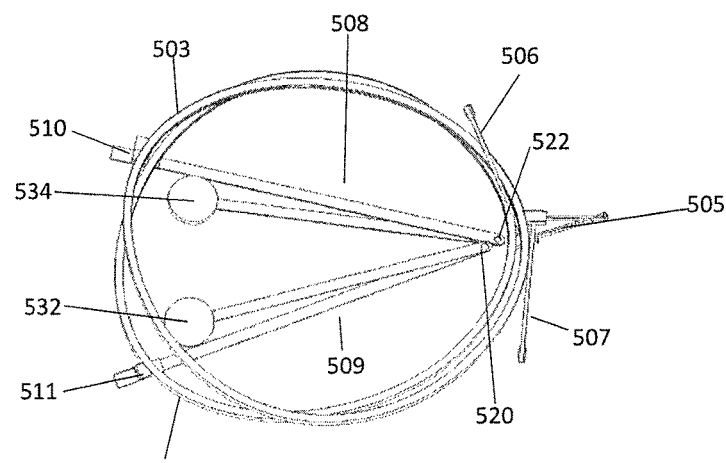
Figure 5G:
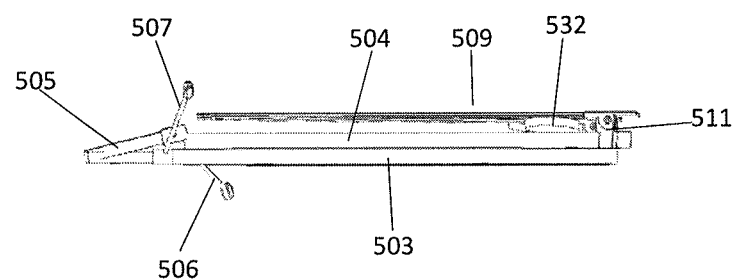
Figure 5H:
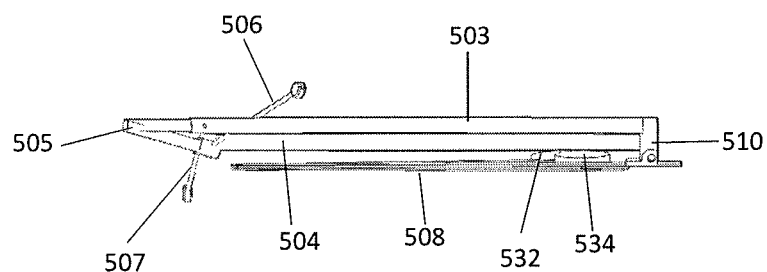

FIGS. 5F-5H show front, top, and bottom views of the glasses 500 in an overlapping configuration with lens frame 504 folded or otherwise moved over lens frame 503. The bridge 505 twists to allow the folding, rotation, or movement of frame 504 over 503. As shown in FIG. 5F, an area of the overlapping configuration is about the area of one lens frame. The nose pieces 506, 507 move along with the lens frames 503, 504 and extend in different directions. They can be flexible to allow them to be repositioned against the frames for storage in the overlapping configuration. The top and bottom views of FIGS. 5G and 5H show that all the components sit flush against one another. The part of the ear pieces parallel to and spaced from lens frame 504 can be pushed against the lens frame 504 for storage as the ear pieces can comprise flexible material.

In the overlapping configuration (e.g., shown in FIGS. 3A-3F and 5F-5H), the glasses can be strong enough to withstand being sit on. For example, the glasses can be configured to withstand a force of about 100 kg. Other forces are also possible (e.g., about 1000-2000 g, 1000-5000 g, 2000 g, 1000-3000 g, 2000-4000 g, 2000-5000 g, 100-200 kg, 50-150 kg, 50-100 kg, 100-200 kg, etc.). This strength comes, at least in part, from all of the folded components being positioned adjacent to one another, without any spacing between components. The tight positioning eliminates any moments than may be created between components.

As shown with respect to FIGS. 2A-3F, in some embodiments, the ear pieces can have a pivot hinge so that the full-length ear pieces can be folded into a configuration contained within the area of the folded lenses. Other configurations are also possible. For example, some embodiments comprise a sliding clasp allowing the ear piece to slide into a configuration contained within the area of the folded lenses.

In some embodiments, the ear pieces, hinges, bridge, or nose pads can be molded onto the lenses, glued, riveted or heat staked directly into the lenses without a lens wire frame.

Figure 6:
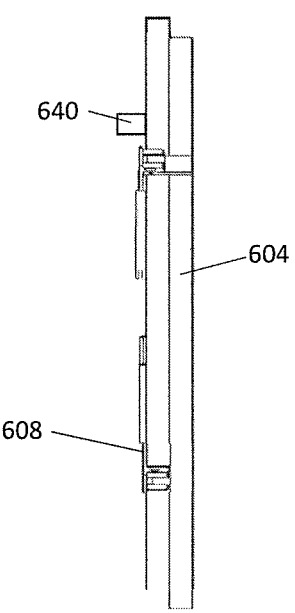
FIG. 6 illustrates a side view of an embodiment of eyeglasses with a protrusion for holding the glasses in an overlapping configuration.

FIG. 6 shows an embodiment of a pair of glasses similar to those shown in FIGS. 1, 2A-2G, 3A-3F, and 5A-5H. One of the lens frames 604 can have a projection 640 on the inside edge, so that when the other lens frame 603 is folded over it the spring force of the bridge will keep the top lens locked in the folded position.

The ear pieces can be used to attach the glasses to an article of closing, a phone case, a wrist band or other suitable convenient carrying method.

Figure 7:
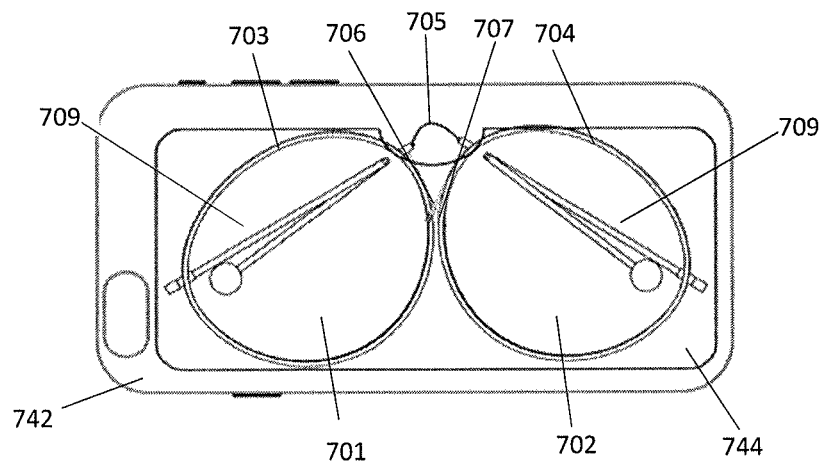
FIG. 7 illustrates an embodiment of eyeglasses stored in a phone case.

FIG. 7 shows an embodiment of glasses in a storage configuration allowing them to be stored in a phone case. It will be appreciated that this configuration can also be used in other storage embodiments (e.g., other cases, bands, articles). The lenses 701, 702 and lens frames 703, 704 are moved toward one another (e.g., rotated together around the bridge 705). The nose pieces 706, 707 are also moved toward one another and are touching. The ear pieces 708, 709 are folded so that they fit within an area of the lenses 701, 702. In such a configuration, the glasses are able to fit within a case 744 of a smartphone 742. As described elsewhere herein, the glasses in this stored configuration can have an ultrathin profile (e.g., about 2.3 mm, 2 mm, 1-3 mm, 1-5 mm, 2-3 mm, 2-5 mm, 2-10 mm, etc.).

FIGS. 8A-8D show various views of another embodiment of eyeglasses 800. Unless otherwise described, the glasses 800 comprise components similar to those shown in FIGS.

1, 2A-2G, 3A-3F, and 5A-5F. FIGS. 8A and 8B show front perspective and top views of the glasses 800 in an open and in a folded configuration. The glasses comprise lenses 801, 802 positioned within lens frames 803, 804, respectively. A bridge 805 connects the lens frames 803, 804. Nose pieces 806, 807 extend from a point on an inner side (e.g., the side closest to the other lens) of each lens frame. The nose pieces terminate in nose pads 836, 838. Hinges 810, 811 connect ear pieces 808, 809 to a side of each lens frame 803, 804. FIG. 8D is a side view of the glasses 800, providing a view of the ear piece 809 comprising first segment 824 and second segment 828, connected by the hinge 820.

FIGS. 8B and 8C show front perspective and top views of the glasses 800 with the ear pieces in a folded configuration. Ear piece 809 is folded towards lens frame 804. Ear piece 809 comprises a first segment 824 and a second segment 828 connected by hinge (e.g., pivot hinge) 820. Ear piece 808 is folded towards lens frame 803. Ear piece 808 comprises a first segment 826 and a second segment 830 connected by hinge (e.g., pivot hinge) 822. As described above with respect to other embodiments, each ear piece folds to fit within the area of the lens. The lens frame 804 can be folded, rotated, or otherwise moved over lens frame 803. In some embodiments, the lens 802 can be rotated around hinge 805 in a clockwise direction so that it passes over the lens 801. The glasses 800 can be configured such that the hinge 811 can catch on the hinge 810, holding the glasses 800 in the folded or compact configuration.

Figure 9A:
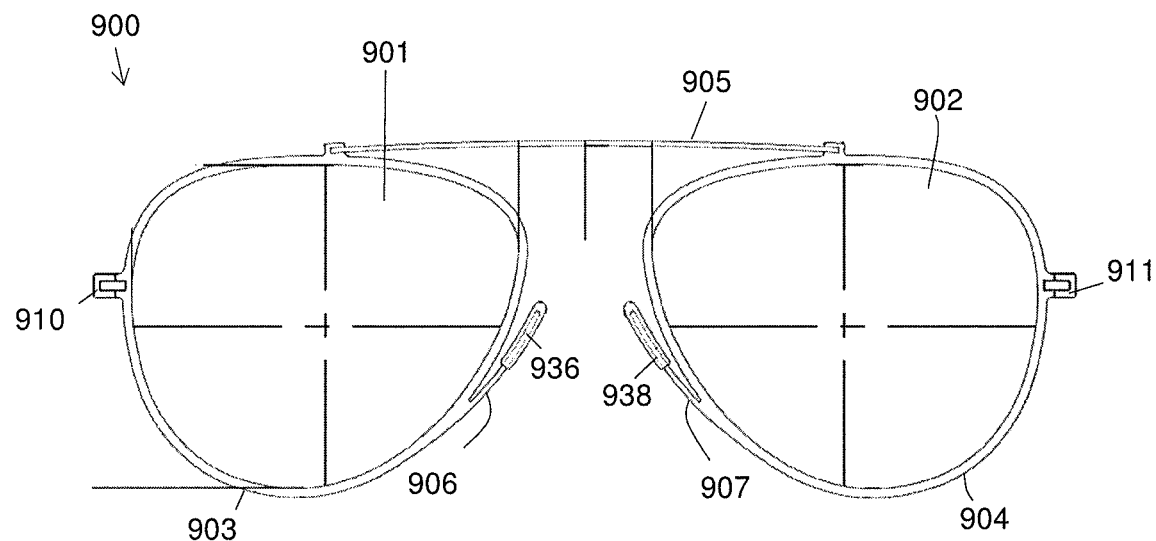
FIGS. 9A-9D illustrate various views of another embodiment of eyeglasses.
Figure 9B:
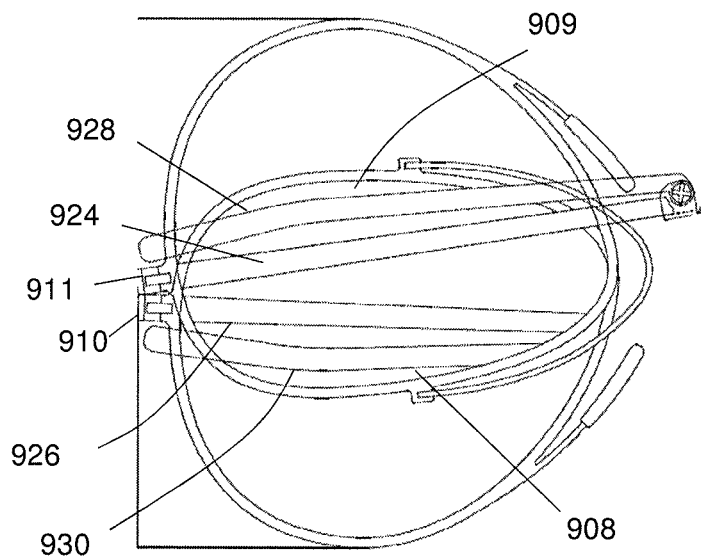
Figure 9C:
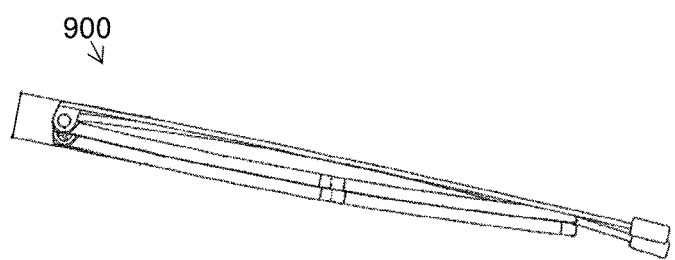
Figure 9D:
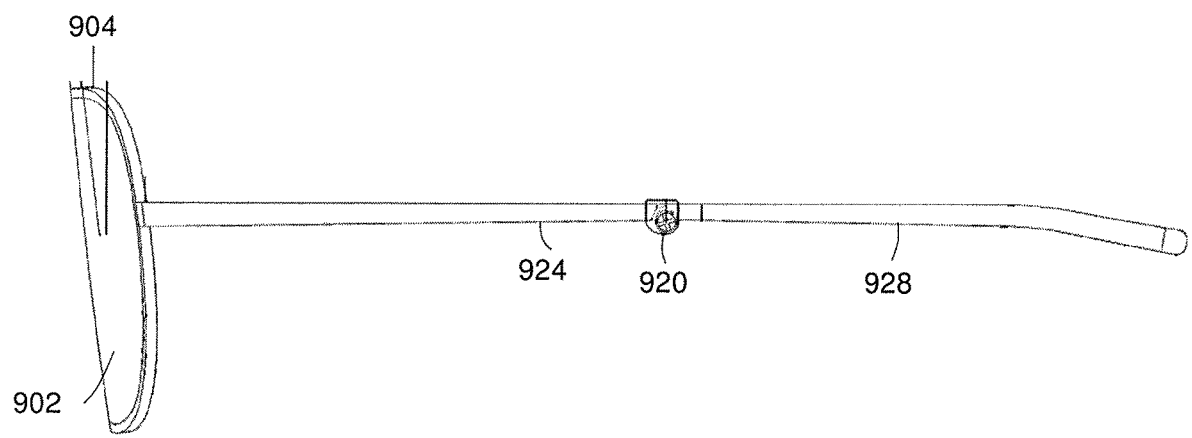

FIGS. 9A-9D show various views of another embodiment of eyeglasses 900. Unless otherwise described, the glasses 900 comprise components similar to those shown in FIGS. 1, 2A-2G, 3A-3F, 5A-5F, and 8A-8D. FIGS. 9A and 9B show front perspective and top views of the glasses 900 in an open and in a folded configuration. The glasses comprise lenses 901, 902 positioned within lens frames 903, 904, respectively. A bridge 905 connects the lens frames 903, 904. Nose pieces 906, 907 extend from a point on an inner side (e.g., the side closest to the other lens) of each lens frame. The nose pieces terminate in nose pads 936, 938. Hinges 910, 911 connect ear pieces 908, 909 to a side of each lens frame 903, 904. FIG. 9D is a side view of the glasses 900, providing a view of the ear piece 909 comprising first segment 924 and second segment 928, connected by the hinge 920.

FIGS. 9B and 9C show front perspective and top views of the glasses 900 with the ear pieces in a folded configuration. Ear piece 909 is folded towards lens frame 904. Ear piece 909 comprises a first segment 924 and a second segment 928 connected by hinge (e.g., pivot hinge) 920. Ear piece 908 is folded towards lens frame 903. Ear piece 908 comprises a first segment 926 and a second segment 930 connected by hinge (e.g., pivot hinge) 922. As described above with respect to other embodiments, each ear piece folds to fit within the area of the lens. The lens frame 904 can be folded, rotated, or otherwise moved over lens frame 903. In some embodiments, the lens 902 can be rotated around hinge 905 in a clockwise direction so that it passes over the lens 901. The glasses 900 can be configured such that the hinge 911 can catch on the hinge 910, holding the glasses 900 in the folded or compact configuration.

Figure 10A:
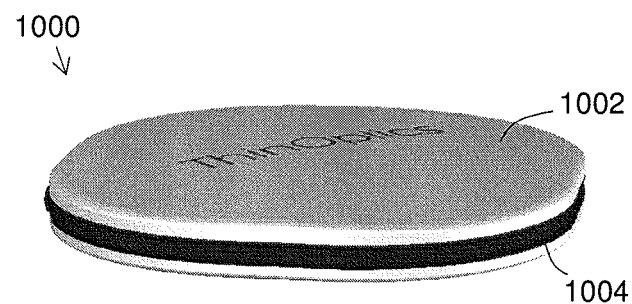
FIGS. 10A-10D depict various views of an embodiment of a case.
Figure 10B:
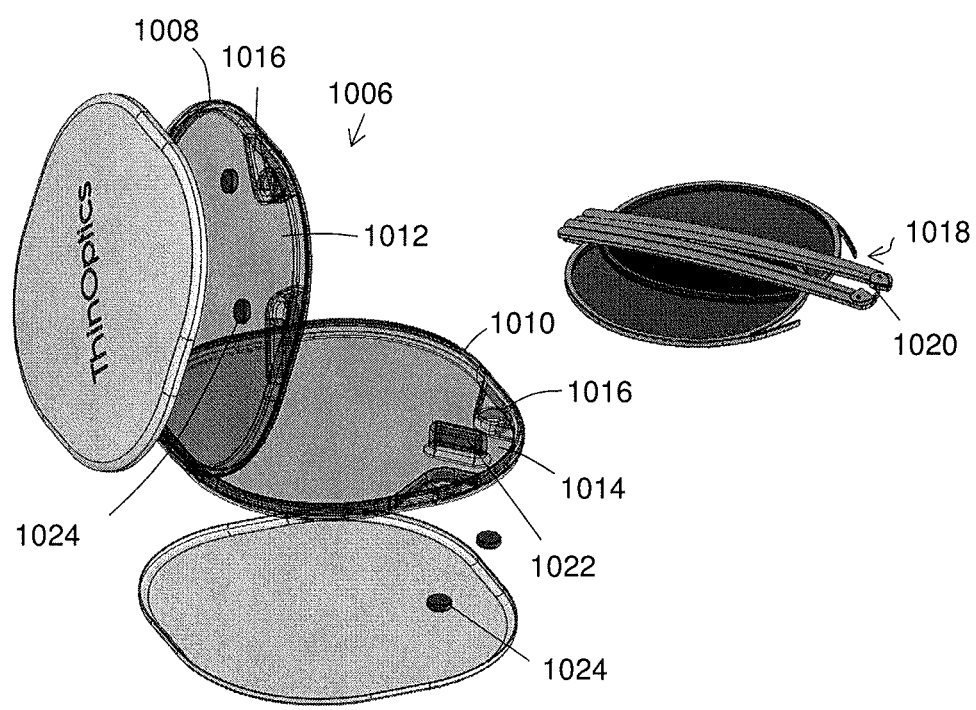
Figure 10C:
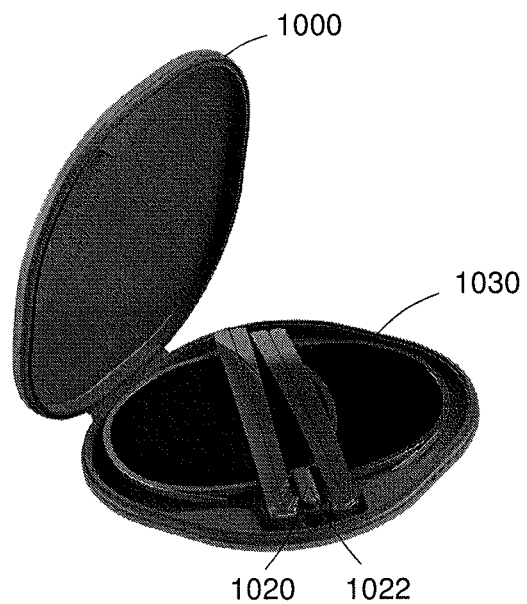
Figure 10D:
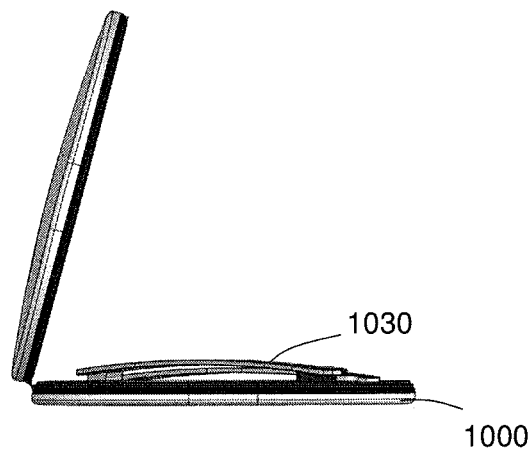

FIGS. 10A-10D illustrate an embodiment of a case 1000 that can be used to hold the glasses disclosed herein in a folded or compact configuration with one lens at least partially folded or rotated over the other lens. FIG. 10A illustrates a top view of the case 1000 in a closed position. The case 1000 comprises a top portion 1002 and a bottom portion 1004. The top portion 402 and bottom portion 404 are hinged together to open as shown in FIGS. 10C and 10D. The case 1000 can be shaped to fit the glasses in a folded configuration. The shape of the case can comprise rounded corners or edges, which can provide comfort to a user. In some embodiments, a thickness of the case is about 4.5 mm. Other thicknesses are also possible (e.g., 4.35-4.5 mm, 4.25-4.75 mm, 4.2-4.7 mm, 4-4.5 mm, 3-5 mm, 3-6 mm, 2-5 mm, 3 mm, 3.2 mm, 3.5 mm, etc.).

In some embodiments, the case can be configured to attach to the back of a smartphone (e.g., using double-sided tape, Velcro, sliding groove, snaps, etc.). The thin profile of the case can advantageously add minimal thickness to a smartphone, allowing a user to carry the glasses case easily with other every day items.

FIG. 10B shows an exploded view of the case 1000. The case comprises an outer shell comprising top portion 1002 and bottom portion 1004 and inner core 1006. The inner core 1006 also comprises a top portion 1008 and bottom portion 1010 hinged together. The inner core 1006 is shaped to fit within the outer shell. The core 1006 comprises a shape and inner walls 1016 configured to match the shape of the glasses, which can provide protection for the glasses, preventing them from being jostled within the case. A space 1012, 1014 in the top and bottom portions 1008, 1010 allows space for the ear pieces and hinge 1018 portion of the glasses in the folded configuration. The bottom portion 1010 can comprise a projection 1022 around which the temple piece 1020 of the glasses can be arranged (FIG. 10C), which can provide more stability to the glasses within the case. FIG. 10B shows the projection 1022 as a pill shape, but other shapes are also possible (e.g., ovular, circular, rectangular, square, etc.). The outer shell and inner core can be attached by, for example, gluing, welding, etc. The outer shell can comprise a material such as brushed aluminum with anodized treatment or stainless steel, for example with an appropriate coating. The inner core can comprise a polycarbonate/AB, in some embodiments.

FIGS. 10C and 10D illustrate a top perspective, and a side view of the case 1000 in an open configuration with a pair of eyeglasses 1030 inserted therein. As described above, the temple 1022 of the glasses is arranged around the projection 1022. The glasses 1030 fit snuggly within the interior of the case 1000. The side view of FIG. 10D shows the thin profile of the glasses 1030 and the case 1000. The case 1000 can be configured to hold different styles of thin glasses, while still providing protection to the varying styles. For example, there may be some extra room in the inner core of the glasses around certain styles of glasses, the extra room allowing accommodation of different styles of glasses that take more room.

The case can be held in a closed position using magnets (e.g., magnets 1024). In some embodiments, the case comprise a latch to hold the case in a closed position.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. An eyewear system comprising:
a first lens;
a second lens;
a resilient bridge connecting the lenses;

a first ear piece extending from a side of the first lens, the first ear piece configured to fold flat against the first lens;

a second ear piece extending from a side of the second lens, the second ear piece configured to fold flat against the second lens;

a first hinge configured to connect the first lens and the first ear piece, wherein the first hinge is positioned within a thickness of the first lens; and a second hinge configured to connect the second lens and the second ear piece, wherein the second hinge is positioned within a thickness of the second lens, and wherein a thickness of the eyewear system when the first and second ear pieces are folded is equal to a thickness of one of the first and second lens plus the thickness of one of the first and second ear pieces plus any base curve thickness.

2. The eyewear system of claim 1, comprising
a first hinge configured to connect the first lens and the first ear piece, wherein the first hinge is positioned within a thickness of the first lens; and
a second hinge configured to connect the second lens and the second ear piece,
wherein the second hinge is positioned within a thickness of the second lens.

3. The eyewear system of claim 2, wherein the first and second hinges protrude from a side of the first and second lenses.

4. The eyewear system of claim 1, wherein the thickness of the eyewear system, when the ear pieces are folded, is about 2-10 mm.

5. The eyewear system of claim 1, wherein the thickness of the eyewear system when the ear pieces are folded is less than about 2.3 mm.

6. An eyewear system comprising:
a first lens;
a second lens;
a resilient bridge connecting the lenses;
a first hinge connecting a first flexible ear piece extending from a side of the first lens to the first lens, the first flexible ear piece configured to fold flat against the first lens;
a second hinge connecting a second flexible ear piece extending from a side of the second lens, the second flexible ear piece offset from the second lens by a thickness of the first lens,
wherein at least a portion of the first lens is configured to be rotated about the resilient bridge and over the second lens to form a compact configuration, wherein, when in the compact configuration, the first hinge is configured to catch on the second hinge to hold the system in a compact configuration, and a thickness of the eyewear system in the compact configuration is equal to a thickness of the first lens, and wherein the thickness of the second lens, the thickness of one of the first and second ear pieces plus any base curve thickness.

7. The eyewear system of claim 6, wherein the thickness of the compact configuration is about 4-10 mm.

8. The eyewear system of claim 6, wherein the thickness of the compact configuration is less than about 4.3 mm.

9. The eyewear system of claim 6, wherein the eyewear system can withstand application a of up to about 100 kg when in the compact configuration.

10. The eyewear system of claim 6, wherein a weight of the system is less than about 12 g plus a weight of the first lens and the second lens.

11. The eyewear system of claim 6, wherein a folded area of the system does not exceed about 2000 $mm^2$.

12. The eyewear system of claim 6, wherein an open angle of the first hinge and the second hinge is less than 90 degrees, thereby keeping the system stable on the user's face.

13. The eyewear system of claim 6, wherein all components of the system in the compact configuration are configured to be positioned adjacent to one another, without any spacing between the components.

14. The eyewear system of claim 6, wherein the first ear piece and the second ear piece each comprise a first and second segment connected by a hinge.

15. The eyewear system of claim 6, wherein the first ear piece and the second ear piece are configured to be contained within the lens against which they fold.

16. A carrying case configured to conform to a folded configuration of the eyewear system of claim 6.

17. The case of claim 16, comprising a top and bottom portion hinged together.

18. A carrying case configured to conform to the compact configuration of the eyewear system of claim 6.

19. The case of claim 18, wherein the case comprises a projection configured to interact with a portion of the glasses to stabilize the eyewear system within the case.

20. The case of claim 19, wherein the first or second hinge of the eyewear system is configured to be hooked around the projection.

21. A method of manufacturing a pair of thin eyeglasses, comprising
providing a first lens;
providing a second lens;
connecting the lenses with a resilient bridge;
connecting a first flexible ear piece to a side of the first lens to the first lens using a first hinge, the first flexible ear piece configured to fold flat against the first lens;
connecting a second flexible ear piece to a side of the second lens using a second hinge, the second flexible ear piece offset from the second lens by a thickness of the first lens,
wherein at least a portion of the first lens is configured to be rotated about the resilient bridge and over the second lens to form a compact configuration, wherein the second hinge is configured to catch on the first hinge when the eyeglasses are in the compact configuration, and wherein a thickness of the eyewear system in the compact configuration is equal to a thickness of the first lens, the thickness of the second lens, the thickness of one of the first and second ear pieces plus any base curve thickness.

22. A method of folding a pair of thin eyeglasses comprising a first lens connected to a second lens by a resilient bridge, comprising
rotating the second lens about the resilient bridge in a clockwise direction until a second hinge connecting a second ear piece to the second lens rotates past a first hinge connecting a first ear piece to the first lens; and
catching the second hinge on the first hinge to hold the eyeglasses in a compact configuration.

23. The method of claim 22, further comprising folding the first ear piece against the first lens.

24. The method of claim 22, wherein folding the first ear piece against the first lens comprises folding a first segment of the first ear piece against a second segment of the first ear piece.

25. The method of claim 22, further comprising folding the second ear piece against the second lens.

26. The method of claim 25, wherein folding the second ear piece against the second lens comprises folding a first segment of the second ear piece against a second segment of the second ear piece.

27. An eyewear system comprising:
- a first lens;
- a second lens;
- a bridge connecting the lenses;
- a first ear piece extending from a side of the first lens, the first ear piece configured to fold flush against the first lens; and
- a second ear piece extending from a side of the second lens, the second ear piece configured to fold flush against the second lens,
- wherein a thickness of the eyewear system when the first and second ear pieces are folded is equal to a thickness of one of the first and second lens plus the thickness of one of the first and second ear pieces plus any base curve thickness.

\* \* \* \* \*